Nov. 14, 1967   R. H. POWERS   3,352,470
ADJUSTABLE GUIDES FOR WEB THREADING APPARATUS
Filed Aug. 9, 1965

INVENTOR.
ROBERT H. POWERS
BY Stanley Belsky
Robert L. Mattans
ATTORNEYS

United States Patent Office 3,352,470
Patented Nov. 14, 1967

3,352,470
ADJUSTABLE GUIDES FOR WEB THREADING APPARATUS
Robert H. Powers, Rochester, N.Y., assignor to Itek Corporation, Lexington, Mass., a corporation of Delaware
Filed Aug. 9, 1965, Ser. No. 478,244
2 Claims. (Cl. 226—91)

ABSTRACT OF THE DISCLOSURE

This disclosure illustrates a self-threading apparatus for conveying photographic film or the like through a pair of wire basket guides and into a pair of driven exit rollers. Means are provided for adjusting the terminal portion of the wire guides with respect to the bite of the exit rollers to effect self threading.

---

The present invention relates to web processors and more particularly to processors for guiding film through a processing unit.

In certain liquid film processors, film is introduced into a development bath by a pair of entrance rollers and is removed from the development bath by a pair of exit rollers. Upper and lower wire basket guides are positioned within the bath and are utilized to support the film and guide it through the bath. In accordance with the prior art, the lip of the lower guide member is positioned in the bite plane of the exit rollers. This arrangement often presents film threading problems after the machine is assembled.

Accordingly, it is the principal object of the present invention to provide a new and improved web or film processor.

A further object of the present invention is to provide a film processor for substantially eliminating film threading problems often encountered in prior art processors.

Figure 1:
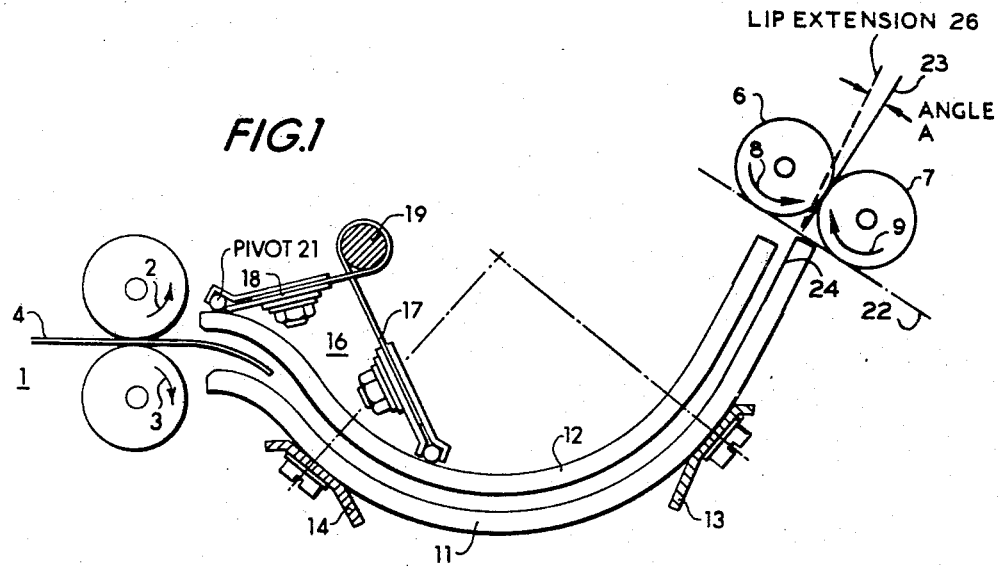

Other objects and advantages of the present invention will become apparent after reading the following description taken in conjunction with the following drawings in which:

FIGURE 1 discloses a side view of the processor assembly embodying the present invention.

Figure 2:
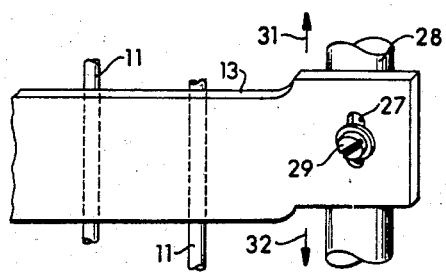

FIGURE 2 discloses a front view of an end portion of one of the cross braces of FIGURE 1.

FIGURE 1 discloses a pair of entrance rollers 1 driven in the direction of arrows 2 and 3 as shown, while film 4 is positioned in the bite plane of the rollers. An upper exit roller 6 and a lower exit roller 7 are rotated in the direction of arrows 8 and 9 by drive means not shown. Lower guide member 11 and upper guide member 12 are positioned in the bath to form a narrow conduit through which film 4 passes upon being processed. Lower guide member 11 and upper guide member 12 comprise a plurality of curved wire guides welded or otherwise affixed to cross brace members 13 and 14, one of which is partially disclosed in FIGURE 2. Upper guide member 12 is adjustably suspended by suspension system 16 which system comprises tension members 17 and 18 supported by stationary post 19 and pivot assembly 21 as shown in FIGURE 1. By changing the effective length of the tension members 17 and 18, upper guide member 12 may be selectively positioned with respect to lower guide member 11 to properly accommodate film 4 entering the processor.

A first plane 22, tangent to exit rollers 6 and 7 is schematically disclosed in FIGURE 1. A second plane 23, which is tangent to exit rollers 6 and 7 at their line of contact, and which is perpendicular to plane 22, is designated as the bite plane of the rollers. A lip portion 24 of lower basket guide member 11 is positioned substantially at the line of intersection of planes 22 and 23 as indicated. A dotted lip extension line 26, which is a graphic representation of the imaginary extension of lip portion 24, "intersects" upper exit roller 6 as shown in the drawing. The angle between lip extension line 26 and bite plane 23 is labeled angle A in the drawing and is between 5° and 20° depending upon the stiffness of the film emerging from the processor. As the stiffness of the film increases, the angle A decreases while as the stiffness decreases the value of A increase all within the aforesaid range, so that the film may "fall" into the bite of the exit rollers.

FIGURE 2 discloses a side view of the right hand terminal portion of cross brace member 13 having curved wires 11 mounted thereon. Cross brace member 13 has an elongated slot 27 formed therein while housing portion 28 has a tapped hole formed therein for receiving machine screw 29. The aforesaid angle A is varied by loosening machine screw 29 and moving cross brace member 13 diagonally up or down in the direction indicated by arrows 31 and 32.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:
1. A web processor assembly comprising:
 (a) an upper guide member;
 (b) a lower guide member positioned with respect to said upper guide member to provide a narrow conduit through which said web may pass to be processed, said lower guide member having a lip portion over which said web passes upon leaving said conduit;
 (c) means for conveying said web to be processed into said narrow conduit;
 (d) a pair of exit rollers for conveying said web out of said narrow conduit, said exit rollers having a first imaginary plane associated therewith, tangent to each exit roller of said pair of exit rollers and a second imaginary bite plane associated therewith and tangent to each roller of said pair of rollers along their line of contact and perpendicular to said first plane and intersecting said first plane along a given line of intersection;
 (e) lower guide member positioning means for positioning said upper lip of said lower guide member substantially at said given line of intersection of said first and second planes, said upper lip being positioned relative to said exit rollers so that its extension line forms an acute angle between 5° and 20° with second plane;
 (f) support means partially defining said conduit;
 (g) a cross brace member having at least one elongated slot formed therein adapted to receive a machine screw;
 (h) means for mounting said support means upon said cross brace member;
 (i) a housing having a tapped hole formed therein; and
 (j) a machine screw positioned within said elongated slot of said cross brace member and said tapped hole of said housing for mounting said cross brace member to said housing.

2. A web processor assembly comprising:
 (a) an upper guide member;
 (b) a lower guide member positioned with respect to said upper guide member to provide a narrow conduit through which said web may pass to be processed, said lower guide member having a lip portion over which said web passes upon leaving said conduit;
(c) means for conveying said web to be processed into said narrow conduit;
(d) a pair of exit rollers for conveying said web out of said narrow conduit, said exit rollers having a first imaginary plane associated therewith, tangent to each exit roller of said pair of exit rollers and a second imaginary bite plane associated therewith and tangent to each roller of said pair of rollers along their line of contact and perpendicular to said first plane and intersecting said first plane along a given line of intersection;
(e) lower guide member positioning means for positioning said upper lip of said lower guide member substantially at said given line of intersection of said first and second planes, said upper lip being positioned relative to said exit rollers so that its extension line forms an acute angle between 5° and 20° with said second plane;
(f) a plurality of curved guide wires;
(g) a cross brace member having at least one elongated slot formed therein adapted to receive a machine screw;
(h) means for mounting said plurality of curved guide wires upon said cross brace member;
(i) a housing having a tapped hole therein; and
(j) a machine screw positioned within said elongated slot of said cross brace member and said tapped hole for mounting said cross brace member to said housing.

References Cited
UNITED STATES PATENTS

| | | | |
|---|---|---|---|
| 1,357,644 | 11/1920 | Leonard | 226—196 |
| 2,925,025 | 2/1960 | Conner | 95—94 X |

FOREIGN PATENTS

| | | |
|---|---|---|
| 768,621 | 2/1957 | Great Britain. |

M. HENSON WOOD, Jr., *Primary Examiner.*

R. A. SCHACHER, *Assistant Examiner.*